US012810467B2

(12) United States Patent
Kim et al.

(10) Patent No.: US 12,810,467 B2
(45) Date of Patent: Nov. 24, 2026

(54) HARDWARE APPARATUS AND METHOD FOR PREDICTING STRUCTURAL CHARACTERISTIC ORIENTATION OF POINT CLOUD OF STRUCTURAL OBJECT

(71) Applicant: POSTECH RESEARCH AND BUSINESS DEVELOPMENT FOUNDATION, Pohang-si (KR)

(72) Inventors: Seungwook Kim, Pohang-si (KR); Chunghyun Park, Pohang-si (KR); Yoonwoo Jeong, Pohang-si (KR); Jaesik Park, Pohang-si (KR); Minsu Cho, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 98 days.

(21) Appl. No.: 18/967,459

(22) Filed: Dec. 3, 2024

(65) Prior Publication Data

US 2025/0191218 A1 Jun. 12, 2025

(30) Foreign Application Priority Data

Dec. 7, 2023 (KR) ........................ 10-2023-0176523
Sep. 10, 2024 (KR) ........................ 10-2024-0123260

(51) Int. Cl.
*G06T 7/73* (2017.01)
*G06T 17/00* (2006.01)

(52) U.S. Cl.
CPC ................ *G06T 7/73* (2017.01); *G06T 17/00* (2013.01); *G06T 2207/10048* (2013.01);
(Continued)

(58) Field of Classification Search
CPC . G06T 7/73; G06T 17/00; G06T 2207/10048; G06T 2207/20081; G06T 2207/20084; G06T 2210/56
See application file for complete search history.

(56) References Cited

U.S. PATENT DOCUMENTS 11,295,170 B1 * 4/2022 Vo ......................... G06T 3/4046
2019/0042883 A1 * 2/2019 Park ..................... G06V 10/764
(Continued)

FOREIGN PATENT DOCUMENTS

KR 10-2024-0031591 A 3/2024

OTHER PUBLICATIONS

Jacobsen, Jörn-Henrik, Bert De Brabandere, and Arnold WM Smeulders. "Dynamic steerable blocks in deep residual networks." arXiv preprint arXiv:1706.00598 (2017) (Year: 2017).*
(Continued)

*Primary Examiner* — Yu Chen
(74) *Attorney, Agent, or Firm* — Morgan, Lewis & Bockius LLP

(57) ABSTRACT

A method by a hardware apparatus can improve stability and consistency in predicting a structural characteristic orientation. The method may include: acquiring a point cloud of a structural object; generating an initial structural characteristic orientation according to a rotational equivariant feature; constructing a standard point cloud; configuring a rotational invariant feature based on the rotational equivariant feature; synthesizing an invariant residual based on the standard point cloud and the rotational invariant feature; rendering a final structural characteristic orientation of the point cloud of the structural object by applying the invariant residual to the initial structural characteristic orientation; and storing or transmitting a result from the final structural characteristic orientation for object recognition, classification, manipula-
(Continued)

tion, navigation or control of the structural object. The hardware apparatus may include a first artificial neural network for generating the rotational equivariant feature and a second artificial neural network for synthesizing the invariant residual.

13 Claims, 4 Drawing Sheets

(52) U.S. Cl.
CPC ............... *G06T 2207/20081* (2013.01); *G06T 2207/20084* (2013.01); *G06T 2210/56* (2013.01)

(56) References Cited

U.S. PATENT DOCUMENTS

| | | | | |
|---|---|---|---|---|
| 2021/0174543 | A1 | 6/2021 | Claessen et al. | |
| 2022/0164986 | A1* | 5/2022 | Zhang | G06T 7/73 |
| 2022/0414821 | A1* | 12/2022 | Zhu | G06T 7/37 |
| 2024/0212195 | A1* | 6/2024 | Sarandi | G01S 17/89 |

OTHER PUBLICATIONS

Deng, Congyue, et al. "Vector neurons: A general framework for so (3)-equivariant networks." Proceedings of the IEEE/CVF international conference on computer vision. 2021. (Year: 2021).*
Kim, Seungwook, et al. "Stable and consistent prediction of 3d characteristic orientation via invariant residual learning." arXiv preprint arXiv:2306.11406 (2023). (Year: 2023).*
Yi, Li, et al. "A scalable active framework for region annotation in 3d shape collections." ACM Transactions on Graphics (ToG) 35.6 (2016): 1-12.
Deng, Congyue, et al. "Vector Neurons: A General Framework for SO(3)-Equivariant Networks." Proceedings of the IEEE/CVF International Conference on Computer Vision. 2021.
Luo, Shitong, et al. "Equivariant point cloud analysis via learning orientations for message passing." Proceedings of the IEEE/CVF Conference on Computer Vision and Pattern Recognition. 2022, pp. 18932-18941.
Chen, Haiwei, et al. "Equivariant point network for 3d point cloud analysis." Proceedings of the IEEE/CVF conference on computer vision and pattern recognition. 2021, pp. 14514-14523.

* cited by examiner

HARDWARE APPARATUS AND METHOD FOR PREDICTING STRUCTURAL CHARACTERISTIC ORIENTATION OF POINT CLOUD OF STRUCTURAL OBJECT

CROSS REFERENCE TO RELATED APPLICATIONS

The present application claims the benefit of and priority to Korean Patent Application No. 10-2023-0176523, filed Dec. 7, 2023 and Korean Patent Application No. 10-2024-0123260, filed Sep. 10, 2024, the entire contents of all of which are incorporated herein by reference for all purposes.

BACKGROUND

Technical Field

The present disclosure relates to methods and apparatus for predicting a characteristic orientation, and particularly to, for example, without limitation, methods and apparatus for predicting a structural characteristic orientation of an object in a 3D point cloud.

Description of the Related Art 3D characteristic orientation prediction is a technique for predicting a structural characteristic orientation in a 3D point cloud. Conventional studies on 3D characteristic orientation prediction focused on stability performance. Stability is a property that canonical orientations remain unchanged even when data are rotated in three-dimensional space. Meanwhile, in 3D data recognition, consistency as well as stability is important. Consistency is the property that the canonical orientations of objects of the same class must be the same, even if the objects have different forms.

The description of the related art should not be assumed to be prior art merely because it is mentioned in or associated with this section. The description of the related art includes information that describes one or more aspects of the subject technology, and the description in this section does not limit the invention.

SUMMARY

The inventors of the present disclosure have recognized the problems and needs of the related art, have performed extensive research and experiments, and have developed a new invention that can achieve high performance in both stability and consistency in the technologies and technical fields of structural characteristic orientation prediction and the applications such as object recognition, classification, manipulation, navigation or control of a structural object.

In one or more aspects of the present disclosure, a method for predicting a structural characteristic orientation of a point cloud using a hardware apparatus may include: acquiring, by a hardware apparatus, a point cloud of a structural object; generating, by the hardware apparatus, an initial structural characteristic orientation of the point cloud of the structural object according to a rotational equivariant feature in the point cloud by using an orientation hypothesizer including a vector neuron; constructing, by the hardware apparatus, a standard point cloud by using the initial structural characteristic orientation and the point cloud; configuring, by the hardware apparatus, a rotational invariant feature by using the rotational equivariant feature and an equivariant vector list produced from the rotational equivariant feature; synthesizing, by the hardware apparatus, an invariant residual based on the standard point cloud and the rotational invariant feature; rendering, by the hardware apparatus, a final structural characteristic orientation by applying the invariant residual to the initial structural characteristic orientation; and storing or transmitting, by the hardware apparatus, a result from the final structural characteristic orientation for object recognition, classification, manipulation, navigation or control of the structural object, wherein: the hardware apparatus includes a first artificial neural network for generating the rotational equivariant feature; the hardware apparatus includes a second artificial neural network for synthesizing the invariant residual; and the final structural characteristic orientation is a structural characteristic orientation of the point cloud of the structural object.

In one or more aspects of the present disclosure, a hardware apparatus for predicting a structural characteristic orientation of a point cloud may include: an interface device configured to acquire a point cloud of a structural object as input; a storage device configured to store a prediction model that predicts a structural characteristic orientation for a received point cloud; and a computing device configured to generate an initial structural characteristic orientation of the point cloud of the structural object according to a rotational equivariant feature in the point cloud by using an orientation hypothesizer of the prediction model, to configure a rotational invariant feature by using the rotational equivariant feature and an equivariant vector list produced from the rotational equivariant feature, to synthesize an invariant residual based on a standard point cloud and the rotational invariant feature, and to render a final structural characteristic orientation by applying the invariant residual to the initial structural characteristic orientation, wherein: the hardware apparatus includes a first artificial neural network for generating the rotational equivariant feature; the hardware apparatus includes a second artificial neural network for synthesizing the invariant residual; and the final structural characteristic orientation is a structural characteristic orientation of the point cloud of the structural object.

In one or more aspects of the present disclosure, a hardware apparatus for predicting a structural characteristic orientation of a point cloud may include: a first artificial neural network; and a second artificial neural network, wherein each of the first and second artificial neural networks includes: a plurality of neuron circuits; and a plurality of synaptic circuits, and wherein: each of the plurality of synaptic circuits is provided between a respective neuron circuit and one or more neuron circuits; each of the plurality of neuron circuits is configured to receive an input and apply a transformation based on a synaptic weight of a respective synaptic circuit; at least some of the plurality of neuron circuits in the first artificial neural network are configured to receive a point cloud of a structural object; the first artificial neural network is configured to generate an initial structural characteristic orientation of the point cloud of the structural object according to a rotational equivariant feature in the point cloud by using a vector neuron; the second artificial neural network is configured to synthesize an invariant residual based on a standard point cloud and a rotational invariant feature; the hardware apparatus is configured to construct the standard point cloud based on the point cloud and construct the rotational invariant feature based on the rotational equivariant feature; and the hardware apparatus is configured to render a final structural characteristic orientation of the point cloud of the structural object based on the invariant residual and the initial structural characteristic orientation.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the present disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure. In the drawings.

Figure 1:
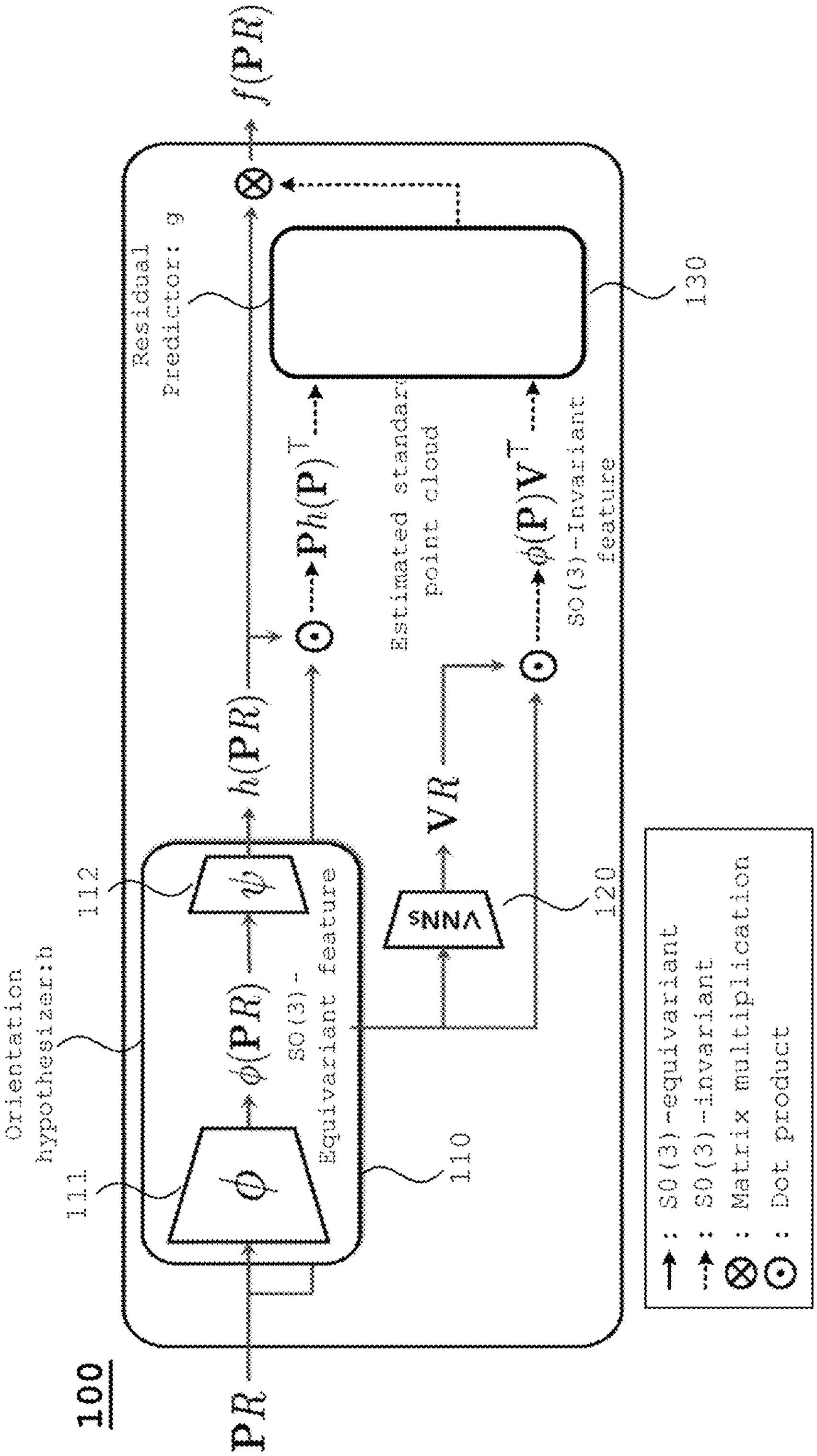
FIG. 1 is an example of a neural network model that predicts a characteristic orientation in a point cloud.

Throughout the drawings and the detailed description, unless otherwise described, the same drawing reference numerals should be understood to refer to the same elements, features, and structures. The sizes of regions and elements, and depiction thereof may be exaggerated for clarity, illustration, and/or convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be understood by those of ordinary skill in the art.

Moreover, descriptions of well-known functions and constructions may be omitted for increased clarity and conciseness. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

Shapes, dimensions (e.g., sizes, lengths, locations, and areas), proportions, ratios, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements (e.g., components, structures, groups, circuits, networks, members, parts, areas, portions, integers, steps, operations, and/or the like), one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. For example, an element may be one or more elements. An element may include a plurality of elements. The word "exemplary" is used to mean serving as an example or illustration. Embodiments are example embodiments. Aspects are example aspects. In one or more implementations, "embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

When a positional relationship between two elements (e.g., components, structures, groups, circuits, networks, members, parts, areas, portions, and/or the like) are described using any of the terms such as "adjacent to," "beside," "next to," and/or the like indicating a position or location, one or more other elements may be located between the two elements unless a more limiting term, such as "immediate(ly)," "direct(ly)," or "close(ly)," is used. Furthermore, the spatially relative terms such as the foregoing terms as well as other terms such as "column," "row," "vertical," "horizontal," "diagonal," and the like refer to an arbitrary frame of reference.

In describing a temporal relationship, when the temporal order is described as, for example, "after," "following," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like may be used herein to describe various elements (e.g., components, structures, groups, circuits, networks, members, parts, areas, portions, and/or the like), these elements should not be limited by these terms, for example, to any particular order, precedence, or number of elements. These terms are used only to distinguish one element from another. For example, a first element may denote a second element, and, similarly, a second element may denote a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

The expression that an element (e.g., component, structure, group, circuit, network, member, part, area, portion, and/or the like) "is engaged" with another element may be understood, for example, as that the element may be either directly or indirectly engaged with the another element. The term "is engaged" or similar expressions may refer to a term such as "is connected," "is coupled," "is combined," "is linked," "is provided," "interacts," or the like. The engagement may involve one or more intervening elements disposed or interposed between the element and the another element, unless otherwise specified.

The terms such as a "line" or "direction" should not be interpreted only based on a geometrical relationship in which the respective lines or directions are parallel, perpendicular, diagonal, or slanted with respect to each other, and may be meant as lines or directions having wider directivities within the range within which the components of the present disclosure may operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item. Further, at least one of a plurality of elements can represent (i) one element of the plurality of elements, (ii) some elements of the plurality of elements, or (iii) all elements of the plurality of elements. Further, "at least some," "at least some portions," "at least some parts," "at least a portion," "at least one or more portions," "at least a part," "at least one or more parts," "at least some elements," "one or more," or the like of a plurality of elements can represent (i) one element of the plurality of elements, (ii) a portion (or a part) of the plurality of elements, (iii) one or more portions (or parts) of the plurality of elements, (iv) multiple elements of the plurality of elements, or (v) all of the plurality of elements. Moreover, "at least some," "at least some portions," "at least some parts," "at least a portion," "at least one or more portions," "at least a part," "at least one or more parts," or the like of an element can represent (i) a portion (or a part) of the element, (ii) one or more portions (or parts) of the element, or (iii) the element, or all portions of the element.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

A phrase "substantially the same" may indicate a degree of being considered as being equivalent to each other taking into account minute differences due to errors in the manufacturing or operating process.

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in more detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for the convenience of description, a scale and dimension of each of the elements illustrated in the accompanying drawings may be different from an actual scale and dimension, and thus, embodiments of the present disclosure are not limited to a scale and dimension illustrated in the drawings.

Before starting detailed explanations of figures, components that will be described in the specification are distinguished merely according to functions mainly performed by the components. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

In one or more aspects, a technique described below is a technique for predicting a characteristic orientation for a point cloud. In one or more aspects, a technique is described for predicting a characteristic orientation for a 3D point cloud. In one or more aspects, a characteristic orientation may refer to a structural characteristic orientation, and vice versa.

A Point cloud refers to a collection of points arranged in three-dimensional space. The point cloud includes three-dimensional information data mainly acquired by using a LiDAR sensor. Furthermore, the point cloud may include points extracted from 3D data in voxel format or mesh data. Accordingly, a point cloud below is not limited to data collected from specific sensors or equipment.

A characteristic orientation refers to an orientation that represents a main orientation of an object or a structural feature of an object in 3D point data.

Hereinafter, it is described that an analysis apparatus predicts a characteristic orientation in a 3D point cloud. The analysis apparatus is a computing apparatus capable of processing point data and controlling the operation of a neural network model. The analysis apparatus may be physically implemented as various types of apparatuses, such as a PC, a smart device, a network server, and a chipset dedicated to data processing. The analysis apparatus predicts a characteristic orientation in a 3D point cloud by using a specific neural network model.

First, general contents and terminology of a characteristic orientation prediction process in a point cloud will be described.

The analysis apparatus predicts a characteristic orientation $R' \in SO(3)$ in a point cloud $P \in \mathbb{R}^{N\times 3}$ centered at an origin. SO(3) refers to a Special Orthogonal 3 group.

In the presence of arbitrary rotation and intra-class variation, the analysis apparatus may predict that point clouds of the same class are aligned in the same canonical orientation by removing a characteristic orientation $R'^T$ due to the rotation. That is, the characteristic orientation prediction aims at stability and consistency. A standardized point cloud $PR'^T$ provides a rotation-invariant representation. The rotation-invariant representation is important for robust 3D recognition.

The analysis apparatus predicts a characteristic orientation {Ri} for arbitrarily rotated point data {PRi} from a point cloud P.

$\{PRiR'^T\}$ represents the standardized point cloud.

A stability metric quantifies the similarity of a canonical orientation predicted from point clouds of the same object with different orientations. The stability metric may be measured as the standard deviation of net rotation $\{RiR'^T\}$ as shown in Equation 1 below.

$$d_{stability}\left(\{R_i R_i'^T\}_{i=1}^K\right) = \sqrt{\frac{1}{K}\sum_{i=1}^{K}\angle\left(R_i R_i'^T, \bar{R}\right)^2} \quad \text{[Equation 1]}$$

In Equation 1, $\bar{R}$ is the chordal $L_2$-mean of $$\{R_i R_i'^T\}_{i=1}^K.$$

$\angle(\bullet,\bullet)$ represents an angle between two rotation matrices.

A consistency metric quantifies the similarities of canonical orientations recovered from different objects in the same category. Assuming there are N different point cloud objects of the same class, the consistency metric may be measured as shown in Equation 2 below.

$$d_{consistency}\left(\{R_j'\}_{j=1}^N\right) = \sqrt{\frac{1}{N}\sum_{j=1}^{N}\angle\left(R_j', \bar{R}\right)^2} \quad \text{[Equation 2]}$$

In Equation 2, $\bar{R}$ is the chordal $L_2$-mean of predicted characteristic orientations $$\{R'_j\}_{j=1}^{N}.$$

In the field of deep learning (or deep machine learning), approaches to 3D rotation may be broadly divided into a rotation-invariant method and a rotation-equivariant method. The rotation-invariant method is a technique for interpreting input data regardless of object rotation in a task such as shape classification. The rotation-equivariant method is a technique for interpreting input data while performing object rotation in a predetermined functional space corresponding to the object rotation based on the representation of SO(3).

Inventors designed a model structure by distinguishing two factors that contribute to determining characteristic orientation in a point cloud. A first and primary element is shape geometry. The characteristic orientation may be determined by the shape geometry. The shape of an object rotated in three-dimensional space remains unchanged and has a consistent characteristic orientation. A second element is shape semantics. The characteristic orientation may be influenced by specific semantic properties. Here, the semantic properties correspond to information that represents the instance or class of a particular object.

The shape geometry and the shape semantics are closely related to each other. Accordingly, during the machine learning process of a neural network model, the two elements may conflict with each other and proper machine learning may be prevented. The inventors separated the elements of the shape geometry and shape semantics from each other in the machine learning process, and used a method that combines SO(3)-equivariant machine learning based on the shape geometry and SO(3)-invariant residual machine learning based on the shape semantics. Invariant residual refers to a residual orientation that is invariant with respect to three-dimensional rotational transformation.

Hereinafter, a neural network model that predicts a characteristic orientation in a 3D point cloud will be described. FIG. 1 is an example of a prediction model 100 that predicts a characteristic orientation in a point cloud. A neural network model or a prediction model below refers to a model having the structure of FIG. 1.

The characteristic orientation prediction model 100 mainly includes two artificial neural networks: one is an orientation hypothesizer 110 and the other is a residual predictor 130. In an example, the two artificial neural networks are separate and distinct from each other.

In one or more examples, during the machine learning process, the first artificial neural network (which may be included in, or may include, the orientation hypothesizer 110) may utilize SO(3)-equivariant machine learning based on the shape geometry, and the second artificial neural network (which may be included in, or may include, the residual predictor 130) may utilize SO(3)-invariant residual machine learning based on the shape semantics.

In one or more aspects, the prediction model 100 using the two artificial neural networks described herein can improve both the stability and consistency of the structural characteristic orientation.

The orientation hypothesizer 110 may include a vector neuron VN that is capable of extracting feature vectors equivariant to three-dimensional rotational transformation.

An SO(3)-equivariant layer contributes to stability in predicting the characteristic orientation. The SO(3)-equivariant layer may use a structure proposed in VNN (see Vector Neuron Networks, Deng, C., Litany, O., Duan, Y., Poulenard, A., Tagliasacchi, A., and Guibas, L. J. Vector neurons: A general framework for so(3)-equivariant networks. In ICCV, 2021).

The VNN is a SO(3)-equivariant neural network structure for processing a point cloud. The vector neuron (VN) extends SO(3) actions from 1D scalars to 3D vectors, mapping the SO(3) actions into a latent space. VN may provide equivariance in conventional neural network operations (a linear operation, a nonlinear operation, pooling, and normalization, etc.). The VNN will be briefly described. The VNN extends the sequence of scalar values representing one neuron into a three-dimensional list of vector features $V \in \mathbb{R}^{C\times 3}$. VNN layers are mapped between batches of vector list features such that equivariance with respect to rotation $R \in SO(3)$ satisfies $f(VR)=f(V)R$.

The orientation hypothesizer 110 may include two SO(3)-equivariant modules. The orientation hypothesizer 110 includes an encoder 111 $\phi$: $\mathbb{R}^{N\times 3} \mapsto \mathbb{R}^{N\times C\times 3}$ and a rotation predictor $\psi$: $\mathbb{R}^{N\times C\times 3} \mapsto SO(3)$ The operation of the orientation hypothesizer 110 is defined as $h:=\psi\circ\phi$.

The prediction model 100 receives an arbitrarily rotated point cloud $PR \in \mathbb{R}^{N\times 3}$.

The encoder 111 processes PR by using the VNN and extracts SO(3)-equivariant features (a location and a color of each point).

The rotation predictor 112 estimates two rotation basis vectors by reducing the channels of the SO(3)-equivariant features extracted from the encoder 111 to two in C. Afterwards, the rotation predictor 112 orthogonalizes the two rotation basis vectors by using a Gram-Schmidt process to predict a characteristic orientation.

Accordingly, the orientation hypothesizer 110 may maintain SO(3)-equivariance as shown in Equation 3 below.

$$h(PR)=\psi(\phi(PR))=\psi(\phi(P))R=h(P)R \qquad \text{[Equation 3]}$$

The VNN 120 receives the SO(3)-equivariant feature output by the encoder 111 and outputs an equivariant vector list feature $V \in \mathbb{R}^{C\times 3}$.

The prediction model 100 may produce SO(3)-invariant features by performing a dot product operation on VR and the transpose matrix $UR \in \mathbb{R}^{C\times 3}$; $(VR)(UR)^T=VRR^TU^T=VU^T$ of other equivariant vector list features.

The equivariance of the 3D rotational transformation of VN ensures the "high stability" of a 3D characteristic orientation predicted by the orientation hypothesizer 110. However, VN does not guarantee "consistency" that can be achieved based on the high-dimensional meaning of 3D data.

Accordingly, the prediction model 100 additionally uses the residual predictor 130 to improve consistency. While conventional approach focuses on stability, the prediction model 100 of the present disclosure can achieve high performance in both stability (e.g., using the orientation hypothesizer 110) as well as consistency (e.g., using the residual predictor 130). Thus, in one or more aspects, the prediction model 100 uses a first artificial neural network (e.g., the orientation hypothesizer 110) to improve stability and uses a second artificial neural network (e.g., the residual predictor 130) to improve consistency.

The residual predictor 130 is an artificial neural network that receives standardized 3D data and feature vectors based on the characteristic orientations initially predicted by the orientation hypothesizer 110, and predicts residuals invariant to 3D rotational transformation.

Meanwhile, the orientation hypothesizer 110 may have difficulty predicting a class-specific characteristic orientation when there is intra-class shape variation. The residual predictor 130 predicts a characteristic orientation that matches a semantic class by adjusting the class-specific orientation h(PR).

The residual predictor 130 predicts a residual between class-specific canonical orientation and a coordinate frame aligned by the estimation of aligned SE(3)-equivariant feature orientations. In this case, the residual may be attributed to SO(3)-invariant properties such as a shape or partiality.

The residual predictor 130 predicts SO(3)-invariant residuals as in g: $\mathbb{R}^{N\times C\times 3}\times\mathbb{R}^{N\times C\times 3}\rightarrow SO(3)$.

The residual predictor 130 receives a (estimated) standard point cloud and SO(3)-invariant features.

As described above, the rotational invariant feature may be generated by a dot product operation between the SO(3)-equivariant feature output from the encoder 111 and the transpose of the equivariant vector list feature VR output from the VNN 120, as shown in Equation 4 below.

$$\phi(PR)(VR)^T = \phi(P)RR^T V^T = \phi(P)V^T \quad \text{[Equation 4]}$$

Meanwhile, the standard point cloud may be obtained through orientation estimation for an input PR as shown in Equation 5 below. The prediction model 100 generate the standard point cloud by performing a dot product operation between the input point cloud PR and the transpose of the h (PR) output from the orientation hypothesizer 110.

$$PRh(PR)^T = PRR^T h(P)^T = Ph(P)^T \quad \text{[Equation 5]}$$

The residual predictor 130 may predict an SO(3)-invariant residual orientation since the residual predictor 130 only receives SO(3)-invariant information.

The prediction model 100 predicts a final characteristic orientation by multiplying a characteristic orientation predicted by the orientation hypothesizer 110 and a 3D residual orientation output from the residual predictor 130. The process of predicting the characteristic orientation of the point cloud PR into which the prediction model 100 is input is as shown in Equation 6 below.

$$\begin{aligned} f(PR) &= g\left(PRh(PR)^T, \phi(PR)(VR)^T h(PR)\right) \\ &= g\left(Ph(P)^T, \phi(P)V^T\right)h(PR) \\ &= g\left(Ph(P)^T, \phi(P)V^T\right)h(P)R \\ &= f(P)R. \end{aligned} \quad \text{[Equation 6]}$$

Two rotated point clouds P1R1 and P2R2 of the same class are assumed. The characteristic orientations of the two point clouds are R'1=f(P1R1) and R'2=f(P2R2), respectively.

A self-supervision objective function $\mathcal{L}$ for achieving consistency in the predicted characteristic orientations is as shown in Equation 7 below.

$$\begin{aligned} \mathcal{L} &= \left\|R_1'^T R_2' - R_1^T R_2\right\|_F^2 \\ &= \left\|f(P_1R_1)^T f(P_2R_2) - R_1^T R_2\right\|_F^2 \\ &= \left\|R_1^T f(P_1)^T f(P_2)R_2 - R_1^T R_2\right\|_F^2 \\ &= \left\|R_1^T\left(f(P_1)^T f(P_2) - I\right)R_2\right\|_F^2 \\ &= \left\|f(P_1)^T f(P_2) - I\right\|_F^2 \\ &= \|f(P_2) - f(P_1)\|_F^2, \end{aligned} \quad \text{[Equation 7]}$$

$I\in\mathbb{R}^{3\times 3}$ is an identity matrix.

The prediction model 100 is trained to minimize the objective function. That is, the prediction model 100 may be trained to minimize difference in characteristic orientations for two different rotation point clouds (with different rotation orientations) of the same class. In this case, the prediction model 100 predicts consistent characteristic orientations from the two point clouds P1 and P2.

Figure 2:
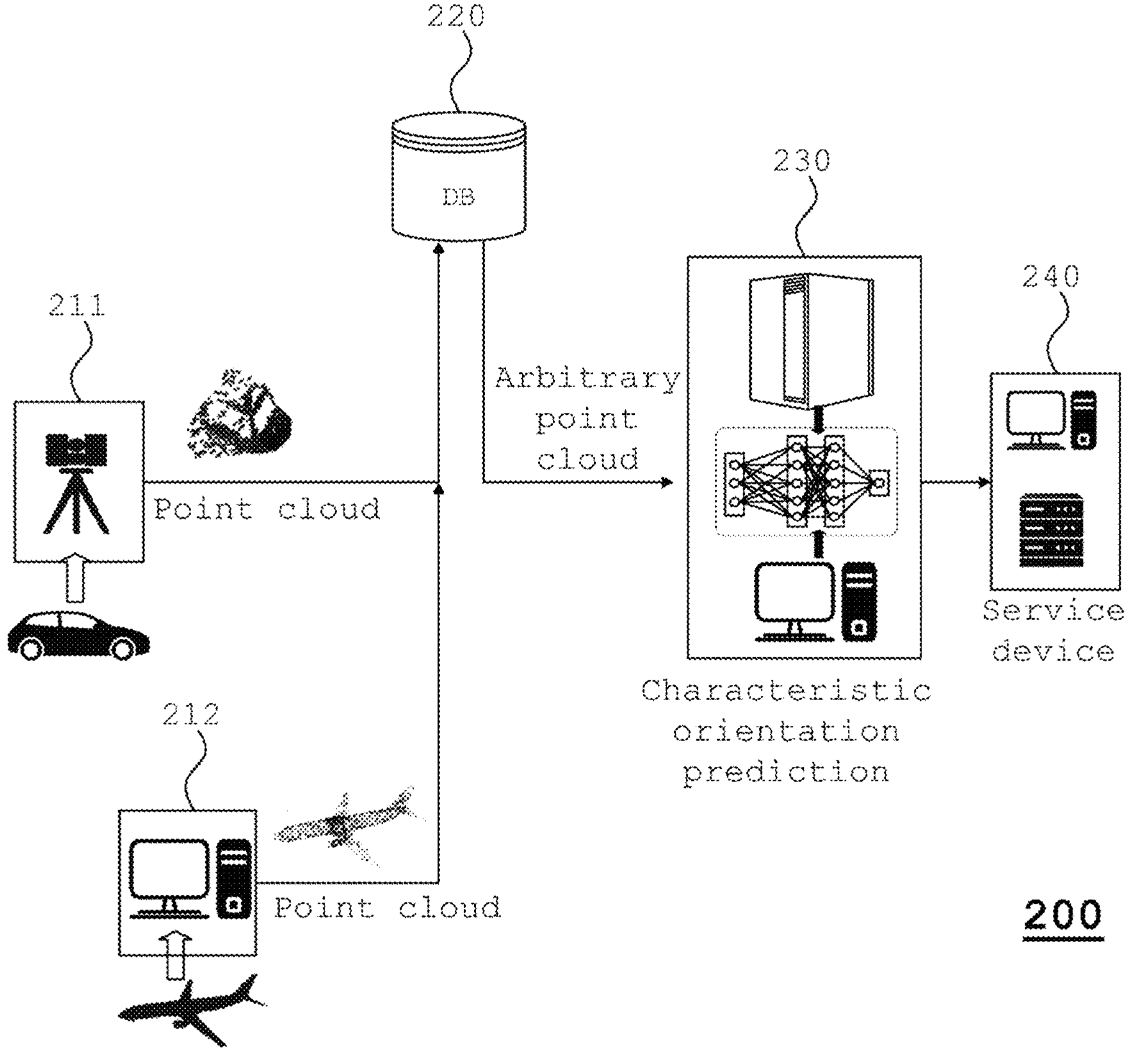
FIG. 2 is an example of a system that predicts a characteristic orientation of a point cloud.

FIG. 2 is an example of a system 200 that predicts a characteristic orientation of a point cloud.

A point cloud generation device 211 generates a point cloud for a real object. The point cloud generation device 211 may be a device such as a laser 3D scanner.

The point cloud generation device 211 may generate a point cloud for a real object. The point cloud generation device 211 may convert a two-dimensional or three-dimensional image object into a point cloud. For example, the point cloud generation device 211 may convert three-dimensional voxel data into a point cloud. The point cloud generation device 211 may also convert 3D voxel data into a point cloud by using a deep learning model (or a deep machine learning model).

A database (DB) 220 may store point clouds for various environments and/or objects.

The analysis apparatus 230 may predict a characteristic orientation for a point cloud by using the prediction model 100 of FIG. 1. The analysis apparatus 230 receives an arbitrary point cloud from the DB 220 and predicts a characteristic orientation. The analysis apparatus 230 may transmit a current point cloud and the characteristic orientation of the corresponding point cloud to a separate service device 240. The service device 240 is a device that provides certain services or contents by using a point cloud. For example, the service device 240 may be a device that generates contents of virtual reality or augmented reality. Alternatively, the service device 240 may be an automated logistics system. The service device 240 may provide a content that is robust to rotation of point data based on a characteristic orientation. Unlike FIG. 2, the analysis apparatus 230 and the service device 240 may be physically a single system.

The inventors built the prediction model described above by using public data sets and verified the performance of the built prediction model.

The inventors built the prediction model to predict characteristic orientation by using ShapeNet (see Yi et al., A scalable active framework for region annotation in 3D shape collections., In SIGGRAPH Asia, 2016). The inventors sampled 1024 points from each of the airplanes, chairs, tables, and cars datasets in the ShapeNet dataset and built the prediction model.

FIGS. 3A, 3B, 3C, and 3D show results of characteristic orientation prediction for an airplane class in a ShapeNet dataset.

Figure 3A:
FIGS. 3A, 3B, 3C, and 3D show results of characteristic orientation prediction for an airplane class in a ShapeNet dataset.
Figure 3B:
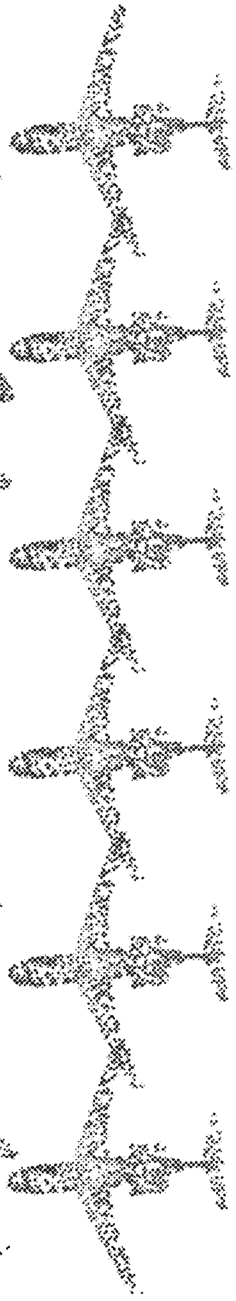

FIG. 3A shows point clouds of the same objects rotated in different directions. FIG. 3B shows standard point clouds predicted by the prediction model for FIG. 3A. Looking at FIG. 3B, it can be seen that canonical orientations predicted by the prediction model have high stability.

Figure 3C:
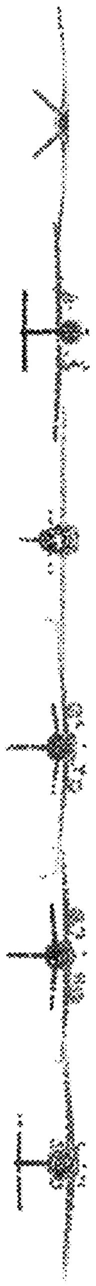
Figure 3D:
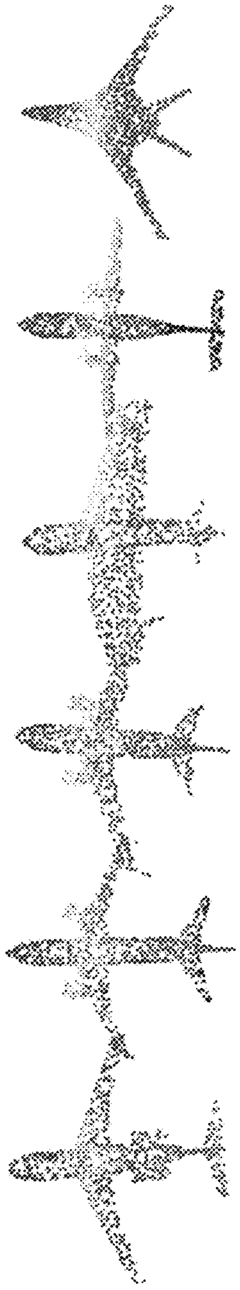

FIG. 3C shows point clouds of different objects of the same class. FIG. 3D shows standard point clouds predicted by the prediction model for FIG. 3C. Looking at FIG. 3C, it can be seen that canonical orientations predicted by the prediction model have high consistency.

Furthermore, the inventors compared performances between conventional models and the prediction model of FIG. 1. The conventional models used Compass (see Spezialetti et al, Learning to orient surfaces by selfsupervised spherical cnns. In NeurIPS, 2020), Canonical Capsules (see Sun et al, Srinet: Learning strictly rotation-invariant representations for point cloud classification and segmentation. In ACM MM, 2019), ConDor (see Sajnani et al., Condor: Self-supervised canonicalization of 3d pose for partial shapes. In CVPR, 2022), and VN-SPD (Katzir et al., Shape-pose disentanglement using se(3)-equivariant vector neurons. In ECCV, 2022).

Meanwhile, the inventors separately built a model to predict a single class and a model to predict multiple classes. Table 1 below shows performance for a single-class prediction model. Table 2 below shows performance for a multi-class prediction model. In the tables below, each of values represents angular difference from a canonical orientation (correct orientation) of each of corresponding data. Accordingly, in the tables below, lower values indicate higher performance. In the tables below, the "Ours" is the prediction model of FIG. 1 according to one or more aspects.

TABLE 1

| | Airplane | | Car | | Chair | | Table | |
|---|---|---|---|---|---|---|---|---|
| Method | Stability | Consistency | Stability | Consistency | Stability | Consistency | Stability | Consistency |
| Compass | 13.81 | 71.43 | 12.01 | 68.20 | 19.20 | 87.50 | 74.80 | 115.3 |
| Canonical Capsules | 7.42 | 45.76 | 4.79 | 68.13 | 81.9 | 11.1 | 14.7 | 119.3 |
| ConDor | 35.93 | 118.00 | 34.52 | 109.55 | 25.98 | 122.08 | 29.68 | 77.99 |
| VN-SPD | 0.02 | 49.97 | 0.04 | 24.31 | 0.02 | 35.6 | 0.02 | 106.3 |
| Ours | 0.67 | 32.07 | 0.24 | 13.52 | 0.33 | 18.91 | 0.85 | 101.23 |

With reference to Table 1, in a single-class model, VN-SPD shows the highest stability, but a prediction model according to one or more aspects of the present disclosure shows the highest consistency.

TABLE 2

| | Airplane | | Car | | Chair | | Table | |
|---|---|---|---|---|---|---|---|---|
| Method | Stability | Consistency | Stability | Consistency | Stability | Consistency | Stability | Consistency |
| Canonical Capsules | 20.96 | 129.03 | 7.08 | 78.29 | 9.11 | 109.04 | 18.62 | 123.25 |
| ConDor | 31.05 | 122.86 | 34.17 | 113.83 | 27.07 | 118.89 | 31.22 | 128.89 |
| VN-SPD | 97.88 | 104.82 | 96.99 | 95.63 | 97.96 | 94.91 | 97.19 | 97.72 |
| Ours | 0.67 | 48.72 | 0.40 | 21.77 | 0.42 | 25.65 | 4.80 | 103.64 |

With reference to Table 2, a prediction model according to one or more aspects of the present disclosure overall shows high performance in both stability and consistency in multi-class prediction.

Figure 4:
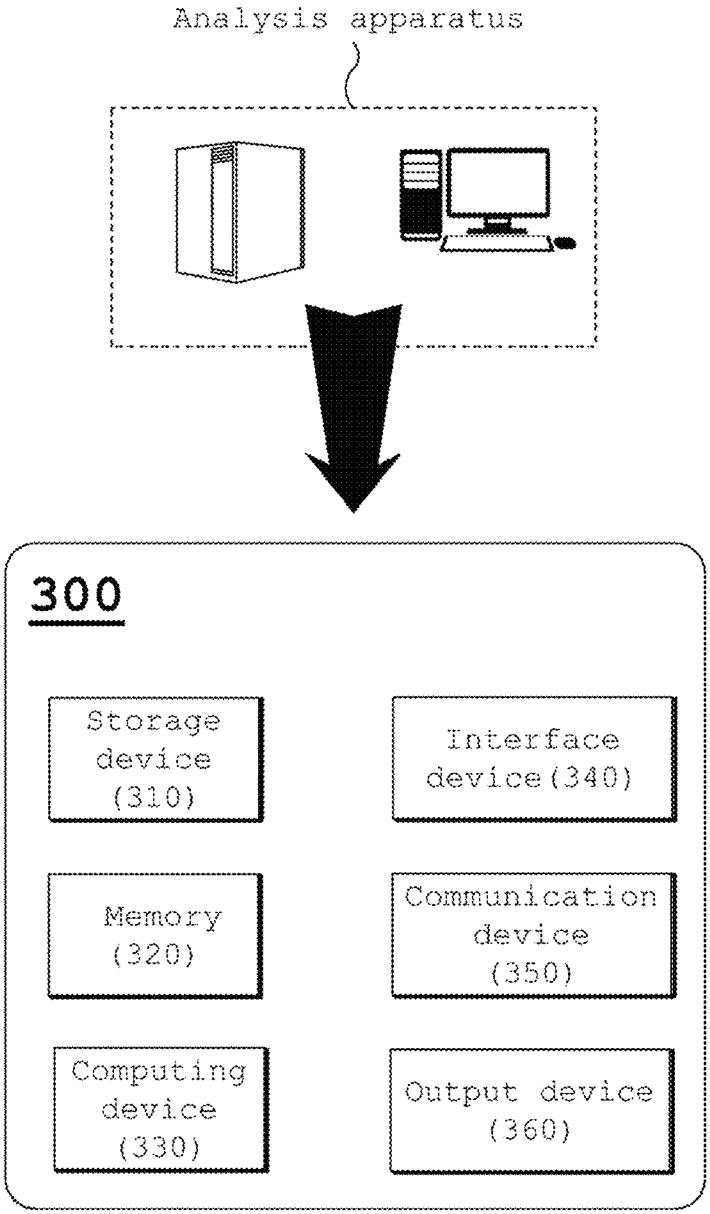
FIG. 4 is an example of an analysis apparatus for predicting a characteristic orientation of a point cloud.

FIG. 4 is an example of an analysis apparatus 300 for predicting a characteristic orientation of a point cloud. The analysis apparatus 300 may be physically implemented in various forms. For example, the analysis apparatus 300 may take the form of a computer device such as a PC, a network server, or a chipset dedicated to data processing, etc.

The analysis apparatus 300 may include a storage device 310, a memory 320, a computing device 330, an interface device 340, a communication device 350, and an output device 360.

The storage device 310 may store the prediction model described above. In this case, the prediction model is a model that predicts a characteristic orientation for an input point cloud. The prediction model may be a single-class prediction model or a multi-class prediction model.

The storage device 310 may store the point cloud that is a subject of analysis.

The storage device 310 may store the characteristic orientation prediction result of the point cloud.

The memory 320 may store data and information generated in the process of predicting the characteristic orientation of a point cloud.

The interface device 340 is a device that receives certain commands and data from the outside.

The interface device 340 may receive the prediction model as input.

The interface device 340 may receive a certain point cloud as input.

The interface device 340 may transmit the characteristic orientation of a point cloud to an external device or object.

The interface device 340 may be configured to internally or externally transmit information received through the communication device 350.

The communication device 350 refers to a component that receives and transmits certain information through a wired or wireless network.

The communication device 350 may receive the prediction model.

The communication device 350 may receive a certain point cloud.

The communication device 350 may transmit the characteristic orientation of the point cloud to an external device.

The computing device 330 may uniformly preprocess the point cloud to be analyzed. For example, the computing device 330 may sample and analyze a predetermined number of points from an initial point cloud.

The computing device 330 may input the point cloud as an analysis target into the prediction model to predict the characteristic orientation.

The computing device 330 may predict the characteristic orientation through a process similar to that in FIG. 1 by using the prediction model.

The computing device 330 inputs a point cloud into the orientation hypothesizer to predict SO(3)-equivariant feature orientation. The computing device 330 extracts the SO(3)-equivariant feature by using the encoder of the orientation hypothesizer. The computing device 330 extracts two rotational basis vectors from the SO(3)-equivariant feature by using the rotation predictor of the orientation hypothesizer, and orthogonalizes the two extracted rotational basis vectors to predict the characteristic orientation.

The computing device 330 estimates the standard point cloud by taking a dot product of the initial point cloud and the transpose of the SO(3)-equivariant feature orientation output by the orientation hypothesizer.

The computing device 330 uses the VNN to produce an equivariant vector list feature from the SO(3)-equivariant features output by the encoder.

The computing device 330 calculates the SO(3)-invariant feature by performing a dot product operation on the SO(3)-equivariant features output by the encoder and the transpose of the equivariant vector list features output by the VNN.

The computing device 330 inputs the estimated standard point cloud and the SO(3)-invariant feature into the residual predictor to produce an SO(3)-invariant residual orientation.

The computing device 330 produces a final characteristic orientation by multiplying the characteristic orientation predicted by the orientation hypothesizer with the three-dimensional residual orientation output from the residual predictor.

The computing device 330 may generate the standardized point cloud (the standard point cloud) with a rotational orientation based on the characteristic orientation of the initial point cloud.

The computing device 330 may be a device, such as a processor, an application processor (AP), an access point, an integrated circuit chip, or an application-specific integrated circuit (ASIC), where the device may include an embedded program that processes data and performs certain operations. In some examples, the device includes multiple devices.

The output device 360 is a device that outputs certain information. The output device 360 may output an interface, an initial point cloud, and a standard point cloud, etc. required for a characteristic orientation prediction process.

Additionally, the method for predicting the characteristic orientation of a 3D point cloud as described above may be implemented as a program (or application) including an executable algorithm that may be executed on a computer. The program may be provided by being stored in a transitory or non-transitory computer readable medium (e.g., the memory 320 or the storage device 310).

The non-transitory computer readable medium refers to a medium that stores data semi-permanently (e.g., the storage device 310) and is capable of being read by a device, rather than a medium that stores data for a short period of time, such as a register, cache, or memory. Specifically, the various applications or programs described above may be provided by being stored in the non-transitory computer readable medium such as a CD, a DVD, a hard disk, a Blu-ray disk, a USB, a memory card, a read-only memory (ROM), a programmable read only memory (PROM), an erasable PROM (EPROM), an electrically EPROM (EEPROM), or a flash memory.

The transitory computer readable medium refers to various types of RAM such as a static RAM (SRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct Rambus RAM (DRRAM).

Various examples and aspects of the present disclosure are described below. These are provided as examples, and do not limit the scope of the present disclosure.

In one or more aspects, a point cloud is a collection of discrete data points in n-dimensional space that represents the structural surfaces of an object, where n can be two or greater (e.g., three). The discrete data points may be in a digital domain. In an example, an object is a structural object. In an example, a structural object is a physical object. In an example, a structural object is a virtual object. In one or more examples, a structural object includes one or more structural objects. In some examples, a structural object is or may include a structural scene or a structural environment. For a three-dimensional space, each point in the cloud has x-y-z coordinates, capturing the position of that point in space, which, when taken together, provide a digital model or outline of the object's geometry.

Point clouds may be generated by scanning technologies, such as light detection and ranging (LiDAR), 3D laser scanners, or stereo cameras. These scans capture multiple points across the surfaces of structural objects, creating a cloud of data points that can be processed to analyze the structure, shape, and orientation of the objects.

In an aspect of structural characteristic orientation prediction, structural characteristic orientation may refer to a defining direction or alignment of structural features within a point cloud. This could be related to the predominant angles, edges, or faces that characterize the spatial structure of a structural object.

In one or more aspects, structural characteristic orientation prediction involves analyzing the distribution and relationships of points in an n-dimensional space to predict how the object is oriented relative to a reference frame, like the x-y-z axes, or to identify recurring directional features across the structure.

In one or more aspects, a purpose of predicting a structural characteristic orientation in a point cloud is to determine the primary orientation or directional characteristics of structures represented by the point cloud, such as the principal axes or surfaces, that define the shape or structure of the object. This is often a critical step for object recognition, classification, manipulation, navigation and/or control of a structural object, where determining the orientation of the structural object is crucial for accurate positioning, manipulation, and/or classification.

In one or more aspects, 3D structural characteristic orientation prediction has a range of applications, significantly enhancing functionality and accuracy. In robotics, it facilitates tasks such as manipulation, navigation, and obstacle avoidance, allowing robots to effectively interact with their environment. In autonomous vehicles, accurate orientation predictions enable safe navigation and collision avoidance, while in augmented reality (AR) and virtual reality (VR), they are critical for seamlessly overlaying digital content. In the aviation sector, 3D structural characteristic orientation prediction is particularly important for airplanes, aiding navigation and control by determining pitch, roll, and yaw for stable flight. This technology is also essential in flight simulators, providing realistic training environments for pilots, and in maintenance processes, where it helps technicians identify potential structural issues. Overall, the application of 3D structural characteristic orientation prediction enhances safety, efficiency, and reliability across multiple industries.

In the technical fields of structural characteristic orientation prediction and its applications, stability as well as consistency are important. However, conventional studies focus on stability and cannot achieve high performance in both stability and consistency. The limitation of the conventional approach hinders its effectiveness, as consistency ensures that the canonical orientations of objects belonging to the same class are the same or uniform. Consistency is essential for reliable object recognition, classification, manipulation, navigation and/or control of a structural object, enabling algorithms to effectively identify and categorize similar objects, regardless of their spatial orientations.

In technical fields such as robotics, autonomous vehicles, and computer vision, maintaining consistency is vital for enhancing the accuracy of pattern recognition and feature identification.

Moreover, consistency is vital for navigation and control, as inconsistent orientation predictions can lead to errors that affect safety and operational efficiency. In aviation, for instance, ensuring that aircraft of the same model exhibit consistent orientation behavior is critical for reliable flight control and performance assessment. Additionally, consistency supports the robustness of machine learning models by allowing them to learn better representations and generalizations, enhancing predictive capabilities across diverse scenarios. Relying solely on stability could result in varying interpretations of similar objects, leading to unreliable predictions and decreased accuracy in tasks such as maintenance inspections or quality control.

The inventors of the present disclosure have recognized the problems and needs of the related art, have performed extensive research and experiments, and have developed a new invention that can achieve high performance in both stability and consistency in the technical fields of structural characteristic orientation prediction and the applications such as object recognition, classification, manipulation, navigation or control of a structural object.

Various examples and aspects of the present disclosure are described further below. These are provided as examples, and do not limit the scope of the present disclosure.

In one or more aspects of the present disclosure, a method is provided for predicting a structural characteristic orientation of a point cloud. The method may be carried out by a hardware apparatus (e.g., 230, 230/240, or 300). In one or more examples, the hardware apparatus is an electronic hardware apparatus. In one or more examples, the hardware apparatus may include the prediction model 100.

Unlike a conventional approach, the methods and apparatus of the present disclosure can yield strong improved performance in both stability and consistency in the technologies and technical fields of structural characteristic orientation prediction and the applications such as object recognition, classification, manipulation, navigation or control of a structural object. The methods and apparatus of the present disclosure realizes an improvement in the functioning of a computer and in the aforementioned technologies and technical fields.

In one or more aspects, in order to provide excellent stability and consistent results, the inventors have separated the elements of shape geometry and the elements of shape semantics from each other in the machine learning process, and the method of the present disclosure uses two artificial neural networks.

In one or more examples, during the machine learning process, the first artificial neural network (which may be included in, or may include, the orientation hypothesizer 110) may utilize rotation-equivariant machine learning based on the elements of shape geometry, and the second artificial neural network (which may be included in, or may include, the residual predictor 130) may utilize rotation-invariant residual machine learning based on the elements of shape semantics.

Accordingly, in one or more examples, during the process of predicting a structural characteristic orientation of a point cloud, the first artificial neural network (e.g., the orientation hypothesizer 110) may produce a high level of stability by generating an initial structural characteristic orientation according to a rotational equivariant feature in the point cloud. Further, the second artificial neural network (e.g., the residual predictor 130) may produce a high level of consistency by generating an invariant residual based on the standard point cloud and the rotational invariant feature. Hence, in one or more aspects, the two artificial neural networks may ensure high levels of both stability and consistency.

In one or more aspects of the methods and apparatus of the present disclosure, the hardware apparatus may acquire a point cloud of a structural object.

To improve stability in the technologies and technical fields of structural characteristic orientation prediction and its applications, the hardware apparatus may generate an initial structural characteristic orientation of the point cloud of the structural object according to a rotational equivariant feature in the point cloud by using the first artificial neural network (e.g., the orientation hypothesizer 110) including a vector neuron.

To improve consistency in the technologies and technical fields of structural characteristic orientation prediction and its applications, the hardware apparatus may construct a standard point cloud by using the initial structural characteristic orientation and the point cloud and configure a rotational invariant feature by using an equivariant vector list produced from the rotational equivariant feature and the rotational equivariant feature.

To improve consistency in the technologies and technical fields of structural characteristic orientation prediction and its applications, the hardware apparatus may then synthesize an invariant residual based on the standard point cloud and the rotational invariant feature using the second artificial neural network (e.g., the residual predictor 130). The hardware apparatus may then render a final structural characteristic orientation of the point cloud of the structural object by applying the invariant residual to the initial structural characteristic orientation, and then store or transmit a result (e.g., a standardized point cloud) from the final structural characteristic orientation for object recognition, classification, manipulation, navigation or control of the structural object.

Unlike a conventional approach, aspects of the present disclosure can improve both stability and consistency (i) by generating the initial structural characteristic orientation according to the rotational equivariant feature using the first artificial neural network (e.g., the orientation hypothesizer 110) and (ii) by synthesizing the invariant residual using the second artificial neural network (e.g., the residual predictor 130). In accordance with aspects of the present disclosure, having excellent stability and consistency in the technologies and technical fields of structural characteristic orientation prediction can improve and enhance accuracy, efficiency, safety and reliability in processes and applications such as object recognition, classification, manipulation, navigation and/or control of the structural object.

In one or more aspects, the hardware apparatus may include the first artificial neural network (e.g., the orientation hypothesizer 110) and the second artificial neural network (e.g., the residual predictor 130). In some examples, the first and second artificial neural networks may be embodied in the storage device 310 and/or the computing device 330. In some examples, the first and second artificial neural networks may be embodied in one or more processors or integrated circuits with embedded weights, parameters and programs. Each of the first and second artificial neural networks may include a plurality of neuron circuits (or neurons). Each neuron circuit may be a processing circuit for receiving an input, applying a transformation, and providing an output. An output may be provided to one or more neuron circuits (e.g., in the next layer). Neuron circuits may be organized into layers, and each layer may perform a distinct operation. Each of the first and second artificial neural networks may include a plurality of synaptic circuits (or connections or edges) between neuron circuits. Each synaptic circuit may include a synaptic weight. Each neuron circuit may be connected to at least one other neuron circuit using a synaptic circuit. In other words, a synaptic circuit may be provided between a respective neuron circuit and one or more neuron circuits. Each neuron circuit may apply a transformation based on a synaptic weight of a respective synaptic circuit. Synaptic weights may be learned during a machine learning process.

In an example, each of the first and second artificial neural networks may include at least thousands of neuron circuits. In an example, each of the first and second artificial neural networks may include at least a million neuron circuits. In an example, each of the first and second artificial neural networks may include at least ten million neuron circuits. In an example, the point cloud may have at least thousands of discrete digital data. In an example, the point cloud may have at least a million discrete digital data. In an example, the hardware apparatus of the present disclosure may perform structural characteristic orientation prediction in real time. In an example, the hardware apparatus of the present disclosure may perform structural characteristic orientation prediction in a few milliseconds. In an example, the neuron circuits and the synaptic circuits operate or include discrete digital data in digital domain.

In a method for predicting a structural characteristic orientation, the hardware apparatus may obtain a point cloud of a structural object. For example, some neuron circuits of the first artificial neural network may receive the point cloud of the structural object as an input.

To improve stability in the technologies and technical fields of structural characteristic orientation prediction and its applications, the first artificial neural network may generate an initial structural characteristic orientation of the point cloud of the structural object according to a rotational equivariant feature in the point cloud by using a vector neuron. In an example, some synaptic circuits of the first artificial neural network may have synaptic weights learned by rotation-equivariant machine learning based on the elements of shape geometry. During training (or the machine learning process), the synaptic weights may be adjusted to minimize a difference between its predicted outputs and the target values. In an example, at least some of the neuron circuits and synaptic circuits of the first artificial neural network may generate the rotational equivariant feature to produce the initial structural characteristic orientation.

To improve consistency in the technologies and technical fields of structural characteristic orientation prediction and its applications, the second artificial neural network may synthesize an invariant residual based on a standard point cloud and a rotational invariant feature. In an example, some neuron circuits of the second artificial neural network may receive the standard point cloud, and some neuron circuits of the second artificial neural network may receive the rotational invariant feature. In an example, some synaptic circuits of the second artificial neural network may have synaptic weights learned through rotation-invariant residual machine learning based on the elements of shape semantics. During training, the synaptic weights may be adjusted to minimize a difference between its predicted outputs and the target values. In an example, at least some of the neuron circuits and synaptic circuits of the second artificial neural network may synthesize the invariant residual.

The hardware apparatus may construct the standard point cloud based on the initial structural characteristic orientation and the point cloud, and construct the rotational invariant feature based on the rotational equivariant feature. The hardware apparatus may render a final structural characteristic orientation of the point cloud of the structural object based on the invariant residual and the initial structural characteristic orientation.

In one or more aspects, unlike a conventional approach, the hardware apparatus having the first and second artificial neural networks can reliably enhance both stability and consistency in predicting a structural characteristic orientation of the point cloud of the structural object, and such stability and consistency can improve accuracy, efficiency, safety and reliability in processes and applications such as object recognition, classification, manipulation, navigation and/or control of the structural object. Further, such stability and consistency provides an improvement in the functioning of a computer having artificial neural networks used for structural characteristic orientation prediction.

The description herein has been presented to enable any person skilled in the art to make, use and practice the technical features of the present disclosure, and has been provided in the context of one or more particular example applications and their example requirements. Various modifications, additions and substitutions to the described embodiments will be readily apparent to those skilled in the art, and the principles described herein may be applied to other embodiments and applications without departing from the scope of the present disclosure. The description herein and the accompanying drawings provide examples of the technical features of the present disclosure for illustrative purposes. In other words, the disclosed embodiments are intended to illustrate the scope of the technical features of the present disclosure. Thus, the scope of the present disclosure is not limited to the embodiments shown, but is to be accorded the widest scope consistent with the claims. The scope of protection of the present disclosure should be construed based on the following claims, and all technical features within the scope of equivalents thereof should be construed as being included within the scope of the present disclosure.

What is claimed is:

1. A method for predicting a structural characteristic orientation of a point cloud using a hardware apparatus, the method comprising:
- acquiring, by a hardware apparatus, a point cloud of a structural object;
- generating, by the hardware apparatus, an initial structural characteristic orientation of the point cloud of the structural object according to a rotational equivariant feature in the point cloud by using an orientation hypothesizer including a vector neuron;
- constructing, by the hardware apparatus, a standard point cloud by using the initial structural characteristic orientation and the point cloud;
- configuring, by the hardware apparatus, a rotational invariant feature by using the rotational equivariant feature and an equivariant vector list produced from the rotational equivariant feature;
- synthesizing, by the hardware apparatus, an invariant residual based on the standard point cloud and the rotational invariant feature;
- rendering, by the hardware apparatus, a final structural characteristic orientation by applying the invariant residual to the initial structural characteristic orientation; and
- storing or transmitting, by the hardware apparatus, a result from the final structural characteristic orientation for object recognition, classification, manipulation, navigation or control of the structural object, wherein:
- the hardware apparatus includes a first artificial neural network for generating the rotational equivariant feature; and
- the hardware apparatus includes a second artificial neural network for synthesizing the invariant residual;
- wherein the final structural characteristic orientation is a structural characteristic orientation of the point cloud of the structural object,
- wherein the first artificial neural network generates the initial structural characteristic orientation based on an SO(3)-equivariant mapping between a rotation of the point cloud and a rotation of the initial structural characteristic orientation; and
- wherein the second artificial neural network generates the invariant residual from SO(3)-invariant inputs comprising the standard point cloud and the rotational invariant feature.

2. The method of claim 1, wherein the orientation hypothesizer includes:
- an encoder configured to generate the rotational equivariant feature by receiving the point cloud as input, and
- a rotation predictor configured to generate the initial structural characteristic orientation by orthogonalizing two estimated basis vectors by receiving the rotational equivariant feature as input,
- wherein the first artificial neural network includes the encoder.

3. The method of claim 1, wherein the hardware apparatus constructs the standard point cloud by performing a dot product operation on the point cloud and a transpose of the initial structural characteristic orientation.

4. The method of claim 1, wherein the hardware apparatus generates the equivariant vector list from the rotational equivariant feature by using a vector neuron network (VNN), and
- configures the rotational invariant feature by performing a dot product operation on the rotational equivariant feature and a transpose of the equivariant vector list.

5. The method of claim 1, wherein the hardware apparatus multiplies the initial structural characteristic orientation by the invariant residual to render the final structural characteristic orientation.

6. The method of claim 1, further comprising:
- constructing, by the hardware apparatus, a standardized point cloud by applying the final structural characteristic orientation to the point cloud,
- wherein the result includes the standardized point cloud.

7. The method of claim 1, wherein:
- generating the initial structural characteristic orientation according to the rotational equivariant feature using the first artificial neural network enhances stability in structural characteristic orientation prediction; and
- synthesizing the invariant residual using the second artificial neural network enhances consistency in structural characteristic orientation prediction.

8. The method of claim 1, wherein:
- elements of shape geometry and elements of shape semantics are separated from each other in a machine learning process; and
- during the machine learning process, the first artificial neural network utilizes rotation-equivariant machine learning based on the elements of shape geometry, and the second artificial neural network utilizes rotation-invariant residual machine learning based on the elements of shape semantics.

9. A hardware apparatus for predicting a structural characteristic orientation of a point cloud, the hardware apparatus comprising:

an interface device configured to acquire a point cloud of a structural object as input;

a storage device configured to store a prediction model that predicts a structural characteristic orientation for a received point cloud; and a computing device configured to generate an initial structural characteristic orientation of the point cloud of the structural object according to a rotational equivariant feature in the point cloud by using an orientation hypothesizer of the prediction model, to configure a rotational invariant feature by using the rotational equivariant feature and an equivariant vector list produced from the rotational equivariant feature, to synthesize an invariant residual based on a standard point cloud and the rotational invariant feature, and to render a final structural characteristic orientation by applying the invariant residual to the initial structural characteristic orientation, wherein:

the hardware apparatus includes a first artificial neural network for generating the rotational equivariant feature;

the hardware apparatus includes a second artificial neural network for synthesizing the invariant residual;

the first artificial neural network is configured to generate the initial structural characteristic orientation based on an SO(3)-equivariant mapping between a rotation of the point cloud and a rotation of the initial structural characteristic orientation;

the second artificial neural network is configured to generate the invariant residual from SO(3)-invariant inputs comprising the standard point cloud and the rotational invariant feature; and wherein the final structural characteristic orientation is a structural characteristic orientation of the point cloud of the structural object.

10. The hardware apparatus of claim 9, wherein the orientation hypothesizer includes:

an encoder configured to generate the rotational equivariant feature by receiving the point cloud as input, and a rotation predictor configured to generate the initial structural characteristic orientation by orthogonalizing two estimated basis vectors by receiving the rotational equivariant feature as input.

11. The hardware apparatus of claim 9, wherein the computing device is configured to construct the standard point cloud by performing a dot product operation on the point cloud and a transpose of the initial structural characteristic orientation.

12. The hardware apparatus of claim 9, wherein the computing device is configured to generate the equivariant vector list from the rotational equivariant feature by using a vector neuron network (VNN), and configure the rotational invariant feature by performing a dot product operation on the rotational equivariant feature and a transpose of the equivariant vector list.

13. The hardware apparatus of claim 9, wherein the prediction model is trained to minimize a difference in structural characteristic orientations for two different rotation point clouds of the same class.

* * * * *